W. J. COVINGTON.
SEEDING ATTACHMENT FOR HARROWS.

No. 177,473. Patented May 16, 1876.

WITNESSES
Henry N. Miller
C. L. Evert

INVENTOR
Wm. J. Covington
By Alexander Mason
Attorney

UNITED STATES PATENT OFFICE.

WILLIAM J. COVINGTON, OF CRYSTAL SPRINGS, MISSISSIPPI.

IMPROVEMENT IN SEEDING ATTACHMENTS FOR HARROWS.

Specification forming part of Letters Patent No. 177,473, dated May 16, 1876; application filed March 4, 1876.

*To all whom it may concern:*

Be it known that I, WILLIAM J. COVINGTON, of Crystal Springs, in the county of Copiah, and in the State of Mississippi, have invented certain new and useful Improvements in Planting Attachment to Harrow; and do hereby declare that the following is a full, clear, and exact description thereof, reference being had to the accompanying drawings, and to the letters of reference marked thereon, making a part of this specification.

The nature of my invention consists in the construction and arrangement of a seed-dropping attachment for harrows, as an improvement on Letters Patent No. 158,040, granted to me December 22, 1874, as will be hereinafter more fully set forth.

In order to enable others skilled in the art to which my invention appertains to make and use the same, I will now proceed to describe its construction and operation, referring to the annexed drawing, in which—

Figure 1:
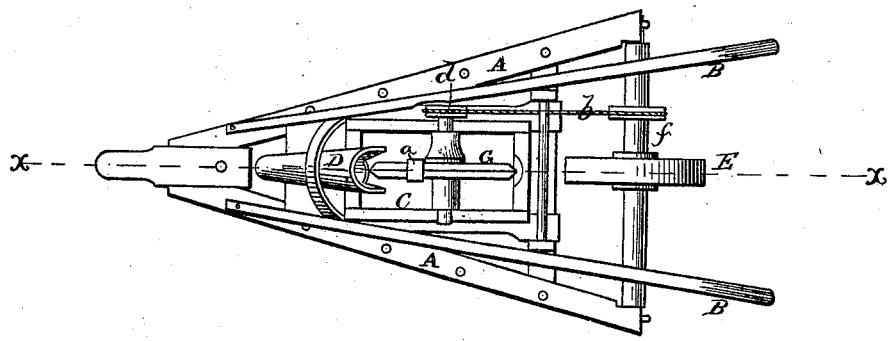
Figure 2:
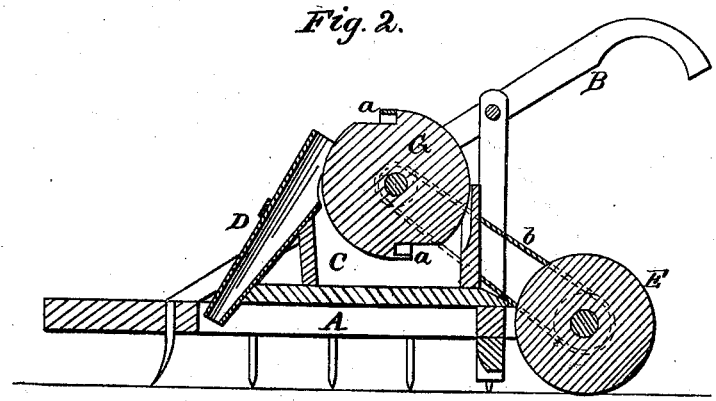

Figure 1 is a plan view of my invention. Fig. 2 is a longitudinal vertical section of the same.

A represents an ordinary V-shaped harrow, provided with handle B B, suitably connected and braced to the frame of the harrow. C is a seed-box, resting upon the harrow-frame between the handles, and provided at its front end with an inclined chute or conductor, D. G is the seed-dropping wheel, having its journal-bearings in the sides of the box C, and provided on its edge with buckets or thimbles $a\ a$, for carrying up the seed from the box and emptying the same into the conductor D. The amount of seed sown can be regulated by the size and number of the buckets secured on the wheel. The wheel is rotated by means of a cord or belt, $b$, connecting a pulley, $d$, on the journal of the wheel G, with a pulley, $e$, on a shaft, $f$, in the rear end of the harrow-frame, and upon said shaft is a wheel, E, which runs on the ground, and thereby imparts motion to the seeding attachment. Any kind of seed may be sown by this machine, and it can be applied to any harrow.

Having thus fully described my invention, what I claim as new, and desire to secure by Letters Patent, as an improvement upon the Patent No. 158,040, granted to me December 22, 1874, is—

The combination, with harrow A, having box C, with inclined chute D, of the solid rotating wheel G, cut out on its periphery, and having buckets $a\ a$, the wheel E, and cord $b$, all constructed substantially as and for the purposes herein set forth.

In testimony that I claim the foregoing I have hereunto set my hand this 9th day of February, 1876.

WILLIAM J. COVINGTON.

Witnesses:
   JNO. T. HOLT,
   G. H. APPEL.